United States Patent [19]
Brinkmann et al.

[11] 3,902,659
[45] Sept. 2, 1975

[54] DEVICE FOR STABILIZING THE ROTOR OF HIGH-SPEED CENTRIFUGES

[75] Inventors: Kurt Brinkmann, Frankfurt; Otmar Kreissl, Dachau; Klaus Umlauf, Zweifall; Gisbert Kunkat, Julich, all of Germany

[73] Assignee: Gesellschaft fur Kernverfahrenstechnik mbH, Julich, Germany

[22] Filed: Dec. 15, 1971

[21] Appl. No.: 208,110

[52] U.S. Cl. ............... 233/23 A; 74/573; 310/105
[51] Int. Cl. ............................................ B04b 9/14
[58] Field of Search .... 74/574, 573; 233/1 C, 23 A, 233/DIG. 1; 188/1 B, 267; 244/1 SA, 166, 170; 308/10; 310/105, 93

[56] References Cited
UNITED STATES PATENTS

| | | | |
|---|---|---|---|
| 3,052,504 | 9/1962 | Wind | 233/1 C |
| 3,216,655 | 11/1965 | Wind et al. | 308/10 X |
| 3,363,856 | 1/1968 | Tossman et al. | 188/1 B X |
| 3,780,937 | 12/1973 | Tahara et al. | 233/1 C X |

Primary Examiner—Benjamin W. Wyche
Assistant Examiner—F. D. Shoemaker
Attorney, Agent, or Firm—Spencer & Kaye

[57] ABSTRACT

A device for stabilizing the rotor movement in high-speed rotary apparatus has an upper magnet bearing formed of a first, axially polarized magnet ring and a second ring made of at least partly ferritic material. One of the rings is secured to the apparatus rotor and the other of the rings is secured to a stationary apparatus member. The rings have radial faces oriented towards and axially spaced from one another. There is provided at least one induction ring affixed to the second ring.

12 Claims, 2 Drawing Figures

DEVICE FOR STABILIZING THE ROTOR OF HIGH-SPEED CENTRIFUGES

BACKGROUND OF THE INVENTION

The present invention relates to a device for stabilizing the rotor movement of high-speed centrifuges in which the rotor revolves around its perpendicular axis and in which energy is removed by damping means from the oscillations occurring in addition to the rotational movements. The device has an upper magnetic bearing including a ring-shaped axially polarized magnet and a ring made of at least partly ferritic material. One ring-shaped ring is attached to the rotor and the other ring to the centrifuge housing. One in such a manner that a clearance is left between the radial faces of the two rings.

A number of designs are known which serve the purpose of stabilizing and damping the oscillations of rotors, revolving around a free axis, by means of magnetic bearings. Thus, in Swiss Pat. No. 366,493 it is suggested that the ring-shaped magnet be elastically supported on the centrifuge housing and located in an oil bath so as to render it able to follow the radial deflections and dampen the oscillations of the other ring-shaped magnet attached to the free end of the rotor. Also in German Pat. No. 1,136,644 a magnet system is described which is connected with the centrifuge housing by damping elements.

Moreover, it is known from German Pat. No. 1,071,593 to provide the upper rotor cover with a top collar in which a hollow iron cylinder is imbedded. Above the iron cylinder there is a magnet connected with the centrifuge housing by means of damping elements.

SUMMARY OF THE INVENTION

On the basis of the state of the art mentioned above, it is an object of the present invention to simplify, with regard to the above-outlined damping, the design of the upper magnetic bearing of a rotor rovolving freely around its perpendicular axis.

This object is accomplished by the present invention, in that the ring, which is made entirely or partly of ferritic material, is equipped with at least one induction ring.

In a preferred embodiment, a concentric groove is provided in the front face of the ferritic ring. Into the groove there is fitted the induction ring which may be made, for instance, of copper, aluminum or alloys of these materials. It is advisable to make the induction ring slightly smaller than the ring-shaped magnet. By contrast, the cylindrical inner and outer walls of the ferritic ring can be aligned with the corresponding cylinder walls of the ring-shaped magnet.

Further according to the present invention, a concentric groove can be provided in the ring-shaped magnet like a pole shoe whose mean diameter and width correspond to those of the induction ring.

Both this measure and the edge webs of the ferritic ring which remain after the groove has been provided, have the effect of increasing the density of the magnetic field lines in the edge areas, which results in a better stabilization and amplification, respectively, of the forces returning the rotor into its initial position.

With respect to this increase in field line density in preferred areas it further feasible to imbed several induction rings concentrically in the ferritic ring with a clearance between them so as to increase the field line density not only in the area of the edge webs but also in the intermediate webs.

When rotor oscillations occur, eddy currents are generated in the induction ring which absorb vibrations.

DESCRIPTION OF THE EMBODIMENTS

Figure 1:
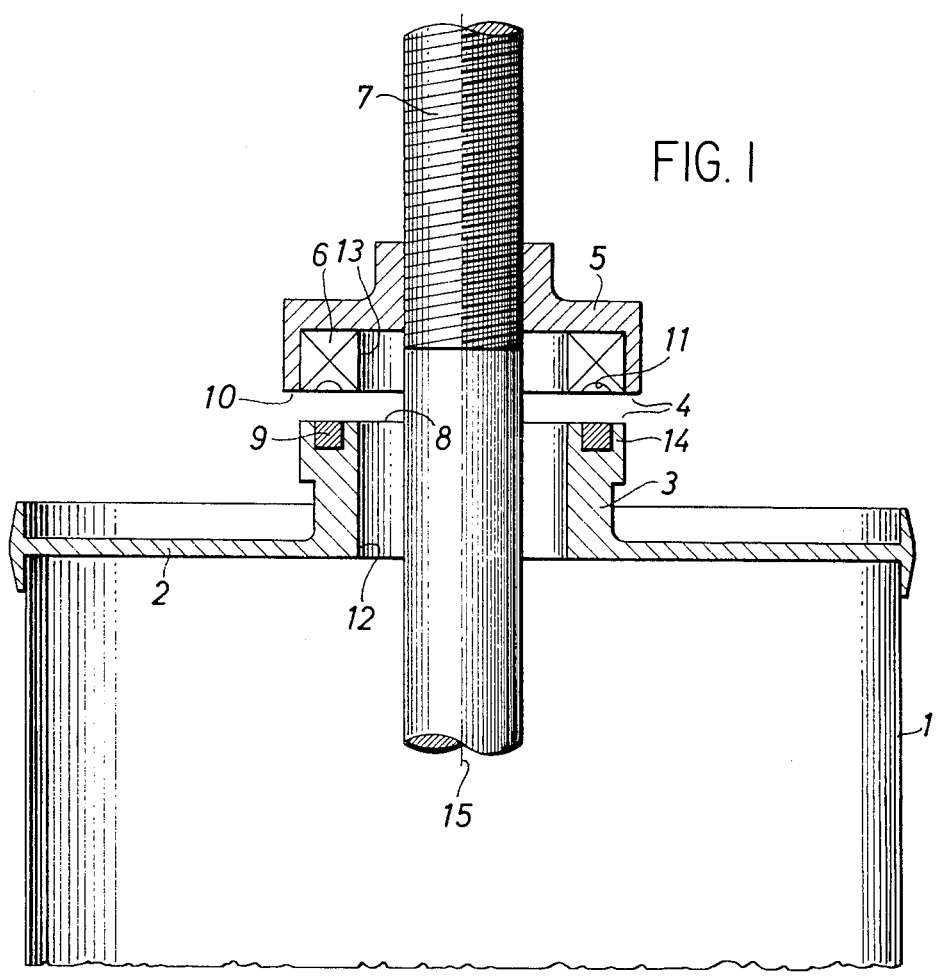
FIG. 1 is an axial section of a first embodiment of the invention, illustrating the upper part of a rotor.

Turning to FIG. 1, on the cylindrical shell 1 of the rotor there is disposed a cover 2 made of ferritic or ferromagnetic materials with a central, annular ring or opening flange 3. Coaxially with the shell and arranged with a small clearance 4 with respect to the flange 3, there is disposed a hub 5 carrying a ring-shaped and axially polarized permanent magnet 6. The hub 5 is connected with the centrifuge housing (not shown) through a threaded spindle 7 so that the width of the clearance 4 can be set. A groove is provided in the radial face 8 of the flange 3 adjoining the clearance 4 for accommodating an induction ring 9 made of copper or aluminum which terminates flush with the plane of the radial face 8 of the ferritic ring 3.

As can be seen further from FIG. 1, the ring-shaped magnet 6 has an annular groove 11 on the radial face 10 adjoining the clearance 4. The radial dimensions of the groove 11 correspond to those of the induction ring 9. The inner bore 12 of the flange 3 corresponds to the inner bore 13 of the ring-shaped magnet. The two bores 12, 13 are in axial alignment with one another. The outside diameters of flange 3 and magnet 6 correspond to each other in the same manner.

If the rotor revolving freely around its perpendicular axis 15 is deflected radially as a consequence of oscillations, the interactions between the ferritic ring 3 and the magnetic ring 6 generate reset forces which return the rotor to its initial position. At the same time, eddy currents are generated in the induction ring 9 which absorb at least part of the energy of oscillation.

Figure 2:
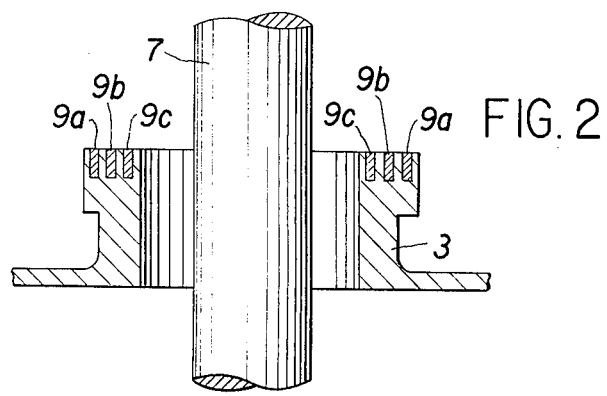
FIG. 2 is an axial section of a second embodiment.

According to another embodiment illustrated in FIG. 2, the ferritic ring 3 is provided with a plurality of concentric, radially spaced induction rings 9a, 9b and 9c imbedded in corresponding grooves of the ferritic ring 3.

The present invention is not restricted to the embodiments shown. Thus, if necessary, the magnet can also be attached to the rotor and the ferritic ring, which accommodates the induction ring, can be attached to the centrifuge housing. This reversal may be advantageous if special provision must be made for heat removal from the induction ring.

The simple design of the bearing is fully retained; this provides optimum preconditions for rational and cost saving mass production.

What is claimed is:

1. In a device for stabilizing the rotor movement in high-speed rotary apparatus having a rotor disposed for rotation about a vertical axis and a stationary member, the device having an upper magnet bearing formed of a first, axially polarized magnet ring and a second ring made of at least partly ferritic material, one of the rings being secured to the rotor and the other of the rings being secured to the stationary member, the rings have radial faces oriented towards and axially spaced from one another; the improvement comprising means providing a concentric groove in the radial face of said second ring; and an induction ring received and fixedly held in said groove, said induction ring being concentric with respect to said second ring.

2. Device as claimed in claim 1, in which the mean diameter of the first ring corresponds to the mean diameter of the induction ring.

3. Device as claimed in claim 1, in which the induction ring is flush with the plane of the radial face of said second ring.

4. Device as claimed in claim 1, in which said first and second rings have corresponding inner and outer radial dimensions.

5. Device as claimed in claim 1, in which the induction ring is made of copper.

6. Device as claimed in claim 1, in which said second ring is made of a ferromagnetic material.

7. Device as claimed in claim 1, in which the induction ring is made of aluminum.

8. Device as claimed in claim 1, in which the induction ring is made of a copper alloy.

9. Device as claimed in claim 1, in which the induction ring is made of an aluminum alloy.

10. In a device for stabilizing the rotor movement in high-speed rotary apparatus having a rotor disposed for rotation about a vertical axis and a stationary member, the device having an upper magnet bearing formed of a first, axially polarized magnet ring and a second ring made of at least partly ferritic material, one of the rings being secured to the rotor and the other of the rings being secured to the stationary member, the rings have radial faces oriented towards and axially spaced from one anther; the improvement comprising an induction ring affixed to said second ring; and means providing a groove in the radial face of said first ring, the width of said groove being equal to the width of said induction ring.

11. Device as claimed in claim 10, said groove is circular and is in axial alignment with said induction ring; said induction ring and said groove have the same diameter.

12. In a device of stabilizing the rotor movement in high-speed rotary apparatus having a rotor disposed for rotation about a vertical axis and a stationary member, the device having an upper magnet bearing formed of a first, axially polarized magnet ring and a second ring made of at least partly ferritic material, one of the rings being secured to the rotor and the other of the rings being secured to the stationary member, the rings have radial faces oriented towards and axially spaced from one another; the improvement comprising means providing a plurality of concentric grooves in the radial face of said second ring; and a plurality of concentric induction rings, each received and fixedly held in separate ones of said grooves.

* * * * *